United States Patent
Koski (10) Patent No.: US 6,537,612 B1
(45) Date of Patent: Mar. 25, 2003

(54) PROCESS FOR TREATING PARTICLES, AND THEIR USE IN DISPERSIONS

(75) Inventor: Ahti August Koski, Wilkesport (CA)

(73) Assignee: Bayer Inc., Sarnia (CA)

( * ) Notice: Subject to any disclaimer, the term of this patent is extended or adjusted under 35 U.S.C. 154(b) by 0 days.

(21) Appl. No.: 09/856,216

(22) PCT Filed: Nov. 19, 1999

(86) PCT No.: PCT/CA99/01095

§ 371 (c)(1),
(2), (4) Date: Jul. 16, 2001

(87) PCT Pub. No.: WO00/31179

PCT Pub. Date: Jun. 2, 2000

(30) Foreign Application Priority Data

Nov. 20, 1998 (CA) .............................................. 2254150

(51) Int. Cl.⁷ ................................................. B05D 7/00
(52) U.S. Cl. ........................ 427/221; 427/212; 427/215; 428/357; 428/405
(58) Field of Search ............................... 427/212, 215, 427/220, 221; 428/357, 402, 403, 405, 407; 524/789; 260/33.6; 556/479

(56) References Cited

U.S. PATENT DOCUMENTS

| 3,689,451 A | 9/1972 | Burke, Jr. ................... 260/33.6 |
| 3,689,452 A | 9/1972 | Burke, Jr. ................... 260/33.6 |
| 3,694,398 A | 9/1972 | Burke, Jr. ................... 260/33.6 |
| 3,700,690 A | 10/1972 | Burke, Jr. ................... 260/33.6 |
| 3,716,513 A | 2/1973 | Burke, Jr. ................... 260/33.6 |
| 3,840,382 A | 10/1974 | Burke, Jr. ................... 106/288 |
| 4,713,411 A | 12/1987 | Kanou et al. ................ 524/560 |
| 4,791,029 A | 12/1988 | Fau et al. .................... 428/447 |
| 5,527,936 A | * 6/1996 | Dindi et al. ................. 556/470 |
| 5,834,536 A | * 11/1998 | Scholl ........................ 523/211 |
| 5,908,951 A | 6/1999 | Kobayashi et al. ......... 556/479 |
| 6,132,874 A | * 10/2000 | Fischer et al. .............. 428/403 |

FOREIGN PATENT DOCUMENTS

| EP | 0533170 | 3/1993 |
| EP | 0 533 170 A1 | * 3/1993 |
| EP | 0904837 | 3/1999 |

OTHER PUBLICATIONS

Ullmann's Encyclopedia of Industrial Chemistry, Fifth, Completely Revised Edition, vol. A 23: pp. 642–643 Refractory Ceramics to Silicon Carbide, Editors: Barbara Elvers, Stephen Hawkins, William Russey, Gail Schulz. (month unavailable) 1993.

* cited by examiner

*Primary Examiner*—Shrive P. Beck
*Assistant Examiner*—Rebecca A. Blanton
(74) *Attorney, Agent, or Firm*—Joseph C. Gil; Noland J. Cheung; Jennifer R. Seng (57) ABSTRACT

A process for treating particles comprising the steps of: (i) contacting the particles with a compound of Formula (I) wherein at least one of $R^1$, $R^2$ and $R^3$ is hydroxyl or a hydrolysable group; and (ii) contacting the particles with a compound of Formula (II) wherein X is an anion and $R^4$ is either: a divalent group —$(C_yH_{2y})$—, branched jor unbranched, wherein y is a whole number from 1 to 40, or a $C_6$–$C_{40}$ aromatic group, and t is either 0 or 1.

42 Claims, 3 Drawing Sheets

PROCESS FOR TREATING PARTICLES, AND THEIR USE IN DISPERSIONS

TECHNICAL FIELD

In one of its aspects, the present invention relates to the treatment of particles, particularly inorganic water-insoluble compounds. The treated particles are useful as intermediates for the production of a particulate material which is specifically, but not exclusively in the compounding of polymers, especially rubbers and plastics.

BACKGROUND ART

Raw polymers, either rubbers or plastics, rarely have the inherent physical or chemical properties in their pure state that are necessary to make useful articles. The polymers must thus be further compounded by mixing with additional ingredients or "additives". Polymer additives may include one or more of: secondary polymers; extender oils; fillers; antioxidants; coloring pigments, stabilizers, flame retardants, processing aids and other ancillary chemicals. For rubbers, this list may be extended to include curatives (vulcanizing agents) such as sulfur or organic peroxides; cure accelerators such as dibenzothiazyl disulphide (MBTS) and tetramethylthiuram disulfide (TMTD), as well as inorganic cure activators such as zinc oxide, lead monoxide (PbO, litharge), red lead ($Pb_3O_4$), and the like. Regardless of whether it is plastic or rubber properties in which improvement is sought, the selected additive materials must be mixed intimately with the polymer at the compounding stage (so as to obtain a homogeneous dispersion) in order for the maximum improvements to be realized. Conventionally, this mixing is usually accomplished on an open mill, in a mixing extruder or in an internal mixer (such as the Henschel, Welex or Banbury types) using one or more steps until the desired/ degree of dispersion is achieved.

Quite often, a satisfactory dispersion of the additive in the polymer is difficult to attain in a reasonable time, resulting in inhomogeneity which translates into unacceptable physical properties or appearance in the formed article. To improve the dispersion, an extended mixing time or multi-stage mixing cycle must be employed which lowers productivity in the mixing plant and is thus undesirable.

Within the industry, it is known that mixing of inorganic chemicals such as the inorganic activators used in the rubber industry presents special difficulties in this regard because of the inherent hardness and much higher viscosity of these chemicals relative to the polymer matrix.

One general method of facilitating mixing and dispersion of these inorganic materials into polymer compounds in the factory is to use a very fine particle size inorganic material. However, this inevitably generates dust during both the material handling and mixing process and in many cases these dust particles are toxic or otherwise unacceptable from a worker health standpoint. Dust losses also change the ratio of the chemicals to the base polymer from what was originally intended; this may lead to poor processing or poor finished properties in the compound. In some specific cases (i.e., with talc), very fine particles may act as a lubricant and actually contribute to poor mixing of the bulk, in this case by reducing the shear which is needed for dispersion. In other cases, especially where polar ingredients must be mixed into a non-polar polymer, agglomeration of the particles may occur during mixing, leading to undesirable inhomogeneity and unsatisfactory physical properties.

To mitigate the above problems, it is well known in the art to add the inorganic chemicals to the base polymer in a predispersed form, e.g., as fine particles bound in a low viscosity medium (or binder) such as polymer or oil, or combinations thereof with additional additives. This bound form of inorganic chemicals overcomes the dust problem in the rubber compounding plant and also greatly shortens the dispersing time of the inorganic materials in the polymer compound, particularly if the binder is chemically similar to the base polymer and the viscosity of the predispersion closely matches that of the rest of the compound. From a compounding standpoint, it is desirable to have the minimum amount of binder that will both facilitate dispersion and eliminate dusting during processing.

These types of "concentrates" or "dispersions" thus typically contain from about 50% to 95% by weight of the active inorganic chemical dispersed in a suitable binder (practically, this corresponds to a range of from 100 to 1900 parts by weight of inorganic chemical per 100 parts by weight of binder). Many such materials are commercially available from a number of suppliers to the rubber industries. Non-limiting examples of such commercial polymer-bound materials used in the rubber industry are: RHENOGRAN® ZnO-85 (85 weight percent zinc oxide dispersed in an EPDM/EVA binder); POLY-DISPERSION® PLD-90 (90 weight percent lead monoxide dispersed in polyisobutylene); RHENOGRAN® $Pb_3O_4$-90 (90 weight percent red lead oxide dispersed in EPDM/EVA), all available from Rhein-Chemie Corporation and Rhein Chemie Reinau GmbH.

Cheaper oil-based binders may also be used; while these address the dust problem, they do not offer as good or as rapid a dispersion as the presence of oil lowers the friction necessary to cause comminution of the inorganic materials during mixing. The presence of oil may also cause other changes in the physical properties (i.e., softening) or appearance (colour) which are undesirable. An example of the latter type of dispersion is Polydex™ PPD (ZnO) 75, a 75 weight percent blend of ZnO in a light process oil, available from Polychem.

In the plastics industry, it is often desired to modify the viscosity (i.e., the "melt index"), hardness, color, light-fastness and/or other properties of the base polymer in order to render it processible or suitable for its intended enduse application. Again, these additives (chemicals), in their pure form, may be added directly to the bulk plastic during the processing (compounding) phase, although it is more customary to use the materials as concentrates in liquid or pellet form in order to obtain better dispersion and better control of the process. Again, these concentrates consist of a dispersion of fine particles of the additive in a suitable carrier or "binder" which may be similar or identical to the base polymer, or it may be another compatible polymer or a combination of polymers and oil. Also, other ingredients (e.g., soaps, compatibilizing agents and dispersing aids) may be included in the base of the binder. This concentrate form is used almost exclusively for introducing inorganic colorants into plastics where the high hardness and high melting point of the additives causes dispersion problems. Many companies currently supply inorganic and organic additive concentrates to the plastics industry; non-limiting examples of the latter materials include. ComPETe™, CELPRO™, Holoflake™, Hanna-FX™ (M.A. Hanna Color), BARKOLEN® (SPUR® a.s.), POLYPLUS™ (PolyTech South Inc.), CEK CONCENTRATES™, COLORPLAST™, CONCORDE™ (C.E.K. Concentrates) and the like.

Conventionally, these pre-dispersed forms of inorganic additives for use in the rubber and plastics industries have been produced by dry mechanical mixing of the ingredients—i.e., the additive in question is simply mechanically mixed with the binder material. Unfortunately, this approach serves only to transfer the mixing and dust problems from the rubber mixing plant to that of the supplier of the dispersion. Moreover, the relatively high percentage of inorganic material to binder desirable in these dispersions generally requires long mixing times or the use of special high energy mixing equipment (HIDM) which either lower productivity or add to the production costs. What would be most desirable is a dispersion manufacturing process that could be made essentially dust-free and required little mixing energy to disperse the inorganic ancillary material in a polymeric binder.

A facile known method to prepare fine particle size materials from coarser commercially available ones is by wet grinding, using either a ball, colloid or steam jet mill or other equipment as described under "Wet Grinding" in Ullman's Encyclopedia of Industrial Chemistry Vol. B2 sec. 5–36. As the fine particles produced are continuously in a wet state, they have little tendency to become airborne dust. However, the concentration of the fine particles in the wetting medium is of necessity low in order to maintain the fluidity required for satisfactory grinding and thus the particles must be insoluble in the grinding medium. Where media other than water is employed during the size reduction process, additional hazards such as flammability and/or toxicity must be taken into consideration. Further, the resulting dispersions typically require concentration (i.e., solvent removal) before they can be further dispersed in a binder. Moreover, it is difficult to dry such fine particles without generating dust elsewhere in the process or without causing agglomeration (particle growth) during the drying step. Where possible, it would be preferable to produce masterbatches, dispersions and concentrates of these particles in suitable binders while the particles are still in a finely divided wet state. It is also preferable for economy and safety perspectives that the wetting medium be water. An additional benefit of using water is that it is generally a non-solvent for most of the organic and inorganic additives which are sold as dispersions.

Further, a number of prior art references teach how to make "masterbatches" of fillers and "dispersions" of other chemicals in polymers by using fine particles dispersed in an aqueous state. For instance, Burke (U.S. Pat. Nos. 3,689,451, 3,689,452, 3,700,690, 3,716,513 and 3,840,382) teaches how to use an aqueous dispersion of never-dried alkali silica pigment or a mixture of an aqueous dispersion of never-dried alkali silica pigment silica and carbon black to make a masterbatch of these fillers in a matrix of rubber at levels of <100 phr of filler (i.e., less than about 50% by weight of the filler dispersed in a rubber matrix). The rubbers must be used as solutions in water-immiscible solvents. Typically, large amounts of ancillary chemicals must also be employed to ensure transfer of the silica from the water suspension into the organic phase. In related patents (U.S. Pat. Nos. 3,686,219 and 3,694,398) Burke teaches how to prepare similar masterbatches from finely (aqueous) dispersed particles of silica by using the rubber in the form of a water emulsion—i.e., a latex. Nonetheless, all of the above Burke patents are restricted to the use of never-dried silica or combinations of never-dried silica and carbon black (i.e., conventional rubber fillers). The levels of the inorganic material in the finished dried masterbatch is moreover restricted to a low concentration and the binder is restricted to elastomers. To the knowledge of the inventor, no commercial masterbatches made by the Burke methods are currently available.

Contrary to the apparent commercial unavailablity of silica masterbatches, masterbatches of carbon black and rubbers prepared from both water emulsions of polymers (i.e., the latex as resulting from emulsion polymerization) and solutions of polymers in hydrocarbons (i.e., as resulting when the polymer is soluble in the polymerization medium) have been available from several suppliers for a number of years (Copolymer Div. of DSM; Bayer Inc.; Goodyear, etc.,). These masterbatches are usually prepared by grinding the carbon black in a wet aqueous state and then intensively mixing the black slurry with a solution-polymer "cement" or emulsion polymer latex, with or without added oil, followed by coagulation and drying. In all commercial masterbatch products, the levels of black filler are <100 phr (i.e., less than about 50% by weight of the filler dispersed in a rubber matrix).

Where the polymer is available as an aqueous emulsion (i.e., latex), various methods are available for the incorporation of ancillary chemicals to form dispersions; the coprecipitation methods of Leo and Johansson (U.S. Pat. No. 4,110,240) may be used to prepare concentrates containing 80–99.5 wt % of the ancillary chemicals (excluding fillers), either organic or inorganic in the polymeric binder. Kanou et al. (U.S. Pat. No. 4,713,411) detail a different coprecipitation process to produce a pigment composition by using a special water-soluble polymeric binder which is then rendered insoluble by pH changes. However, many polymers, especially plastics, are prepared by a solution polymerization process and are not readily available in a latex form.

Despite previous efforts in the prior art, there remains a need for an efficient manner of producing masterbatches, dispersions or concentrates of inorganic additive materials in a binder.

DISCLOSURE OF THE INVENTION

It is an object of the present invention to obviate or mitigate at least one of the above-mentioned disadvantages of the prior art.

It is another object of the present invention to provide a novel process for treating particulate material.

Accordingly, in one of its aspects, the present invention provides a process for treating particles to render them hydrophobic, the process comprising the steps of:

(i) contacting the particles with a compound of Formula I:

wherein at least one of $R^1$, $R^2$ and $R^3$ is hydroxyl or a hydrolysable group; and (ii) contacting the particles with a compound of Formula II:

wherein X is an anion and $R^4$ is either: a divalent group —$(C_yH_{2y})$—, branched or unbranched, wherein y is a whole number from 1 to 40, or a $C_6$–$C_{40}$ aromatic group, and t is either 0 or 1.

In another of its aspects, the present invention provides a process for treating particles comprising the step of contacting particles having one or more of the following formulae:

III(a)

III(b)

III(c)

III(d)

III(e)

wherein:

P is a particle;

$R^a$ and $R^b$ may be the same or different and each is selected from the group comprising $C_{1-40}$ alkyl, $C_{2-40}$ mono- or $C_{3-40}$ di-unsaturated alkenyl and $C_{6-40}$ aromatic;

w is an integer in range of 1 to $10^6$ or more; with a compound of Formula II:

(II)

wherein X is an anion and $R^4$ is either: a divalent group —$(C_yH_{2y})$—, branched or unbranched, wherein y is a whole number from 1 to 40, or a $C_6$–$C_{40}$ aromatic group, and t is either 0 or 1.

BRIEF DESCRIPTION OF THE DRAWINGS

Embodiments of the present invention will be described with reference to the accompanying drawings, in which.

BEST MODE FOR CARRYING OUT THE INVENTION

Throughout this specification, the invention is illustrated with reference to silica as the particle having surface hydroxyl groups, but it should be appreciated that the invention applies to the use of other similar materials, and the description understood accordingly. Thus, the present invention is particularly useful to the treatment of inorganic water-insoluble compounds. Preferably the inorganic water insoluble compounds useful for treatment are those such compounds in which the chemical formula contains an oxygen atom, more preferably such compounds which the formula also contains a metal atom. More than one metal atom may be present in the chemical formula. Examples of suitable groups of useful oxygen atom compounds may be selected from the group comprising oxides, hydroxides, borates, sulfates, carbonates, silicates, phosphates, chromates and the like. Non-limiting examples of suitable oxygen atom and metal atom containing compounds may be selected from the group comprising silicon dioxide (silica), titanium oxide (titania, both rutile and anatase forms), ferric oxide, hydrated ferric oxide, ferrous oxide, antimony oxide, barium carbonate, zinc oxide, zinc borate, lead oxide (including red lead oxide), dibasic lead phosphite, lead silicate, tribasic lead sulfate and mixtures thereof. Other suitable metal atom- and oxygen atom-containing compounds, especially those which are water insoluble or only slightly soluble in water, will be readily apparent to those of skill in the art based on the foregoing discussion. For example, a particularly preferred application of the present invention is to render hydrophobic colorant or pigment particles which are typically used in the plastics industry. Non-limiting examples of suitable such particles may be selected from the group consisting of α-FeOOH (goethite), γ-FeOOH (lepidocrocite), α-$Fe_2O_3$ (hematite), γ-$Fe_2O_3$ (maghemite) and $Fe_3O_4$.

The preferred particles for the production of masterbatches by this invention is precipitated silica. In a preferred embodiment, the treatment is carried out in an aqueous dispersion or slurry of the particles. Generally, the precise make up of the slurry is not particularly restricted provided that it is a mobile suspension and remains so during the treatment process. Practically, it is preferred that the slurry contain the maximum amount by weight of particles to be treated which will still allow it to remain mobile. The maximum weight that will allow mobility to be maintained will vary directly according to the particle size of the silica and inversely with the concentration of surface silanol groups. Practically, concentrations of between 20–25 weight percent silica in water are usually possible with dried precipitated silicas and somewhat lower concentrations for never-dried silicas (i.e. filter cakes) as will be discussed later.

Dried amorphous silica suitable for use in accordance with the invention may have a mean agglomerate particle size between 0.1 and 100 microns, preferably between 0.1 and 50 microns and most preferably between 1 and 25 microns. It is preferred that less than 10 percent by volume of the agglomerate particles are below 5 microns or over 50 microns in size. A suitable amorphous dried silica moreover has a BET surface area, measured in accordance with DIN (Deutsche Industrie Norm) 66131, of between 50 and 450 square meters per gram and a DBP absorption, as measured in accordance with DIN 53601, of between 150 and 400 grams per 100 grams of silica, and a drying loss, as measured according to DIN ISO 787/II, of from 0 to 10 percent by weight.

If a wet silica filter cake is used, it may be made by filtering and optionally washing silica prepared by any known means such as described in Ullmann's Encyclopedia of Industrial Chemical Vol A23 pages 642–643, VCH Publishers, ®1993. The filter cake has a preferred solids content of between 10 and 30 percent by weight, most preferably between 15 and 25 percent by weight, and it may be redispersed in water in accordance with the present process to give a silica concentration of between 5 and 20 percent by weight and most preferably between 8 and 12 percent by weight. It is preferred to use a silica filter cake. It is more preferred to use a silica filter cake which is formed from a silica precipitated by means of carbon dioxide or hydrochloric acid or a combination thereof, and it is most preferred to wash the filter cake with water prior to redispersion in order to remove dissolved salt by-products.

If a never-filtered slurry prepared from the known reaction of a solution of alkali metal silicate with either mineral acid or carbon dioxide is used, it is preferred that the solids content of the never-filtered slurry be between 5 and 30, more preferably between 5 and 20, and most preferably between 10 and 20 percent by weight of silica.

The preferred particles for the production of dispersions by this invention are those metal- and oxygen-atom containing compounds that form a subset within materials broadly referred to as 'pigments' in rubber and plastics industries' vernacular. While these materials may not be used in these industries as pigments in the true sense, this terminology has remained since the materials were originally employed in the paint industry.

In a preferred embodiment, the treatment is carried out in an aqueous dispersion or slurry of the pigment particles. Generally, the precise make up of the slurry is not particularly restricted provided that it is a mobile suspension and remains so during the treatment process. Practically, it is preferred that the slurry contain the maximum amount by weight of particles to be treated which will still allow it to remain mobile. The maximum weight that will allow mobility to be maintained will vary directly according to the particle size of the filler, the degree of crystallinity of the filler and inversely with the concentration of surface hydroxyl groups. The shape of the particles also influences the achievable concentration; higher concentrations are achievable with rounded particles than with particles which have a highly structured surface. Concentrations of between 30–60 weight percent of pigment in water are usually realizable with dried pigments and somewhat lower concentrations for never-dried pigments (i.e. filter cakes) as will be discussed later. The maximum working concentration is best determined by experiment. Dried pigments for use in accordance with the invention may have a mean agglomerate particle size between 0.01 and 500 microns, preferably between 0.1 and 50 microns and most preferably between 1 and 10 microns. It is preferred that less than 10 percent by volume of the agglomerate particles are below 0.1 microns or over 100 microns in size.

If a pigment filter cake is used, it may be redispersed in water in accordance with the present process to give a workable concentration. It is preferred to use pigment filter cake and it is most preferred to wash the filter cake with water prior to redispersion in order to remove dissolved salt by-products. Whether a dispersion or masterbatch is desired, the temperature of the slurry of silica or pigment particles suitable for practising the invention may be between 0° and 100° C. if the process is conducted at atmospheric pressure or between 0° and 135° C. if the operation is conducted in a pressure vessel. Most preferably, the process is conducted at atmospheric pressure in which case the preferred temperature is between 0° and 95° C. and most preferably between 100° and 90° C. The selection of atmospheric pressure or a pressure vessel is within the purview of a person skilled in the art having regard to a number of factors, including temperature and the respective volatilities of the specific reactants chosen for the process. Where volatility becomes an issue, the vessel may be equipped with a reflux condenser.

It is desirable that, prior to the addition to the silica or pigment particles of the compound of Formula I, the slurry shall be vigorously agitated. It is preferred to have a slurry pH in the range from 4 to about 6.5, more preferably from about 4.5 to about 6.5. If necessary, the pH can be adjusted by addition of acid or alkali, for example mineral acid, alkali metal hydroxide, alkaline earth hydroxide, ammonium hydroxide and the like. These can be added as such or in aqueous solution.

In the compound of Formula I, it is preferred that all three of the groups $R^1$, $R^2$ and $R^3$ are readily hydrolysable. Suitable groups $R^1$ include hydroxyl groups and hydrolysable groups of formula $OC_pH_{2p+1}$, where p has a value from 1 to 10. The alkyl chain can be interrupted by oxygen atoms, to give groups, for example, of formula $CH_3OCH_2O-$, $CH_3OCH_2OCH_2O-$, $CH_3(OCH_2)_4O-$, $CH_3OCH_2CH_2O-$, $C_2H_5OCH_2O-$, $C_2H_5OCH_2OCH_2O-$, or $C_2H_5OCH_2CH_2O-$. Other suitable hydrolysable groups include phenoxy, acetoxy, chloro, bromo, or iodo. $R^2$ and $R^3$ can take the same values as $R^1$. It will of course be understood that one, two or all three of $R^1$, $R^2$ and $R^3$ may be selected from groups of formula $OC_pH_{2p+1}$ as defined above, phenoxy, acetoxy, hydroxyl, chloro, bromo or iodo. Preferably, only one or two of $R^1$, $R^2$ and $R^3$ is hydroxyl and most prefereably none are hydroxyl. Non-limiting examples of groups $R^2$ and $R^3$ that are not hydrolysable include $C_{1-10}$ alkyl, $C_{2-10}$ mono- or di-unsaturated alkenyl, and phenyl. It is preferred that $R^1$, $R^2$ and $R^3$ are all the same and are $CH_3O$, $C_2H_5O-$ or $C_3H_5O-$. Most preferably they are all $CH_3O-$ or $C_2H_5O-$.

The next step in the present process comprises contacting the particles with a compound of Formula II:

$$CH_2=CH-[R^4]_t-CH_2-X \qquad (II)$$

wherein X is an anion and $R^4$ is either: a divalent group $-(C_yH_{2y})-$, branched or unbranched, wherein y is a whole number from 1 to 40, or a $C_6$–$C_{40}$ aromatic group and t is either 0 or 1.

Preferably, $R^4$ is $-(C_yH_{2y})$ wherein y is from 1 to 2, more preferably t is 0 to 1, even more preferably t is 0—i.e., the compound of Formula II is $CH_2=CH-CH_2-X$.

Preferably, X is selected from the group consisting of acetate, chloride, bromide, iodide, cyanide, thiocyanide, isothiocyanide and sulphate. It is preferred to contact the particles with the compound of Formula II in the presence of a catalyst. The catalyst may be added separately to the slurry, either before or after the addition of the compound of Formula II, or it may be added with the compound of formula II, i.e., by dissolving or suspending the catalyst therein. The choice of catalyst is within the purview of a person of ordinary skill in the art. The catalyst is such that it is able to promote hydrosilylation between the compound of Formula II and the reaction product of the particles and the compound of Formula I.

In one embodiment, the catalyst is an inorganic catalyst. As used throughout this specification, the term "inorganic catalyst" is meant to include organometallic catalysts. Preferably, the inorganic catalyst comprises a Noble metal or a transition metal. More preferably, the transition metal is selected from Group VIII of the Periodic Table. See, for example, *J. Mol. Catal.* 81 (1993) pgs. 207–214 (Tanaka et al.). Even more preferably, the inorganic catalyst comprises platinum. A non-limiting example of such a catalyst is haloplatinic acid (e.g., chloroplatinic acid). Most preferably the platinum catalyst is one that is highly efficient at promoting hydrosilyation reactions in an aqueous medium. Such catalysts are described by Kobayashi et al. in U.S. Pat. No. 5,908,951.

In another embodiment the catalyst is an organic catalyst. Preferably, the organic catalyst comprises a free radical generating compound. The choice of a suitable such compound is within the purview of a person of ordinary skill in the art. Even more preferably, the organic catalyst is selected from the group comprising peroxides, persulfates, azo catalysts and mixtures thereof. A non-limiting example of an azo catalyst comprises azobisisobutyronitrile. It is preferred that the azo catalyst is one that is water soluble—see U.S. Pat. No. 5,908,951 [Kobayashi et al.] for a discussion of particularly preferred organic catalysts useful in the present process. It is even more preferred that the water soluble azo catalyst has a 10 hour half life between 25° C. and 100° and most preferable that it has a 10 hour half-life between 40° C. and 90° C. Such water soluble azo catalyst are commercially available from Wako Chemical USA, Inc., under the trade names VA-044, V-50, VA061, V-501 and VA-086.

In yet another embodiment, the catalyst may be hydrogen peroxide.

Where the catalyst used is a inorganic silylation catalyst, it is preferred to add the catalyst as a solution or suspension in compound of Formula II; where a free radical catalyst is employed, it is preferred to add the catalyst after the compound of Formula II has been added to the slurry.

Figure 1:
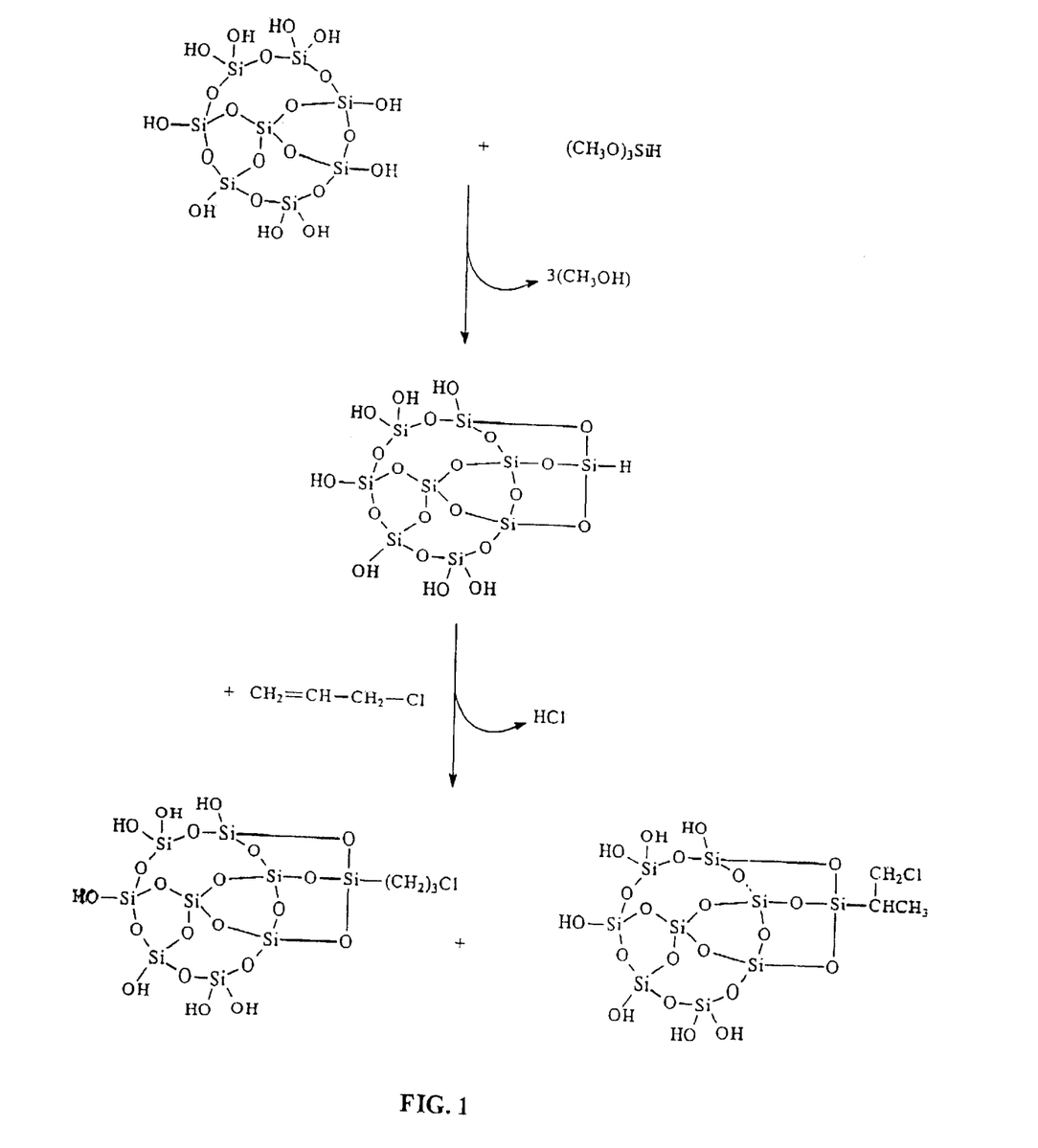
FIG. 1 illustrates an embodiment of the present process.

With reference to FIG. 1, and without wishing to be bound by any particular theory or mode of action, there is illustrated a preferred embodiment of the present process which illustrates two modes by which hydrosilylation may be effected.

Figure 2:
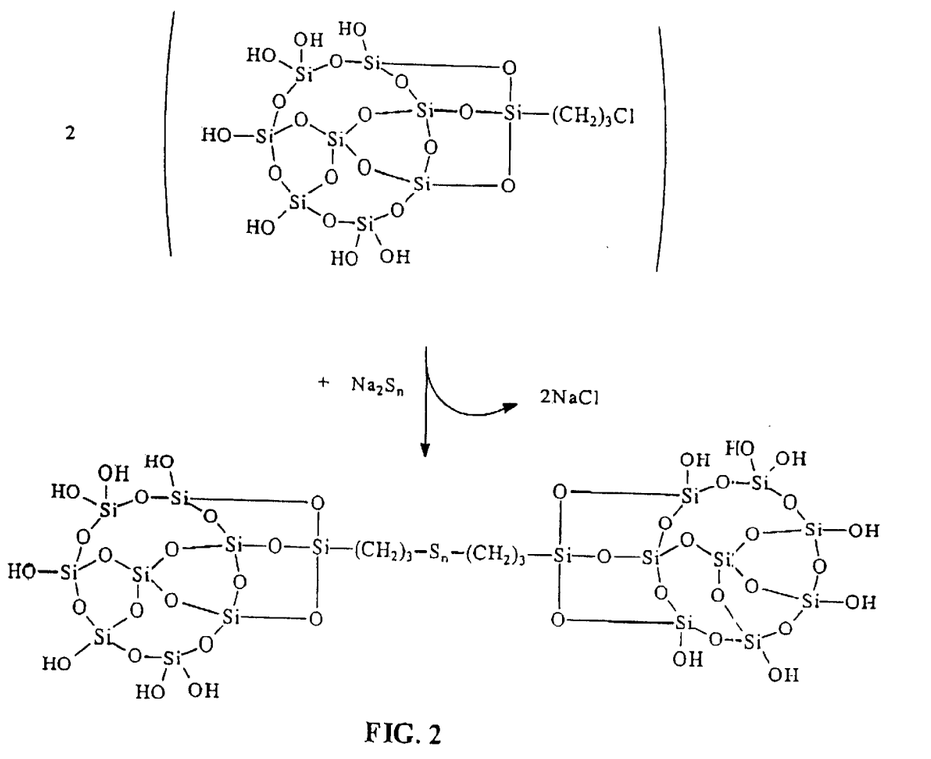
FIG. 2 illustrates a first example of the use of the product of a product of the present process illustrated in FIG. 1.
Figure 3:
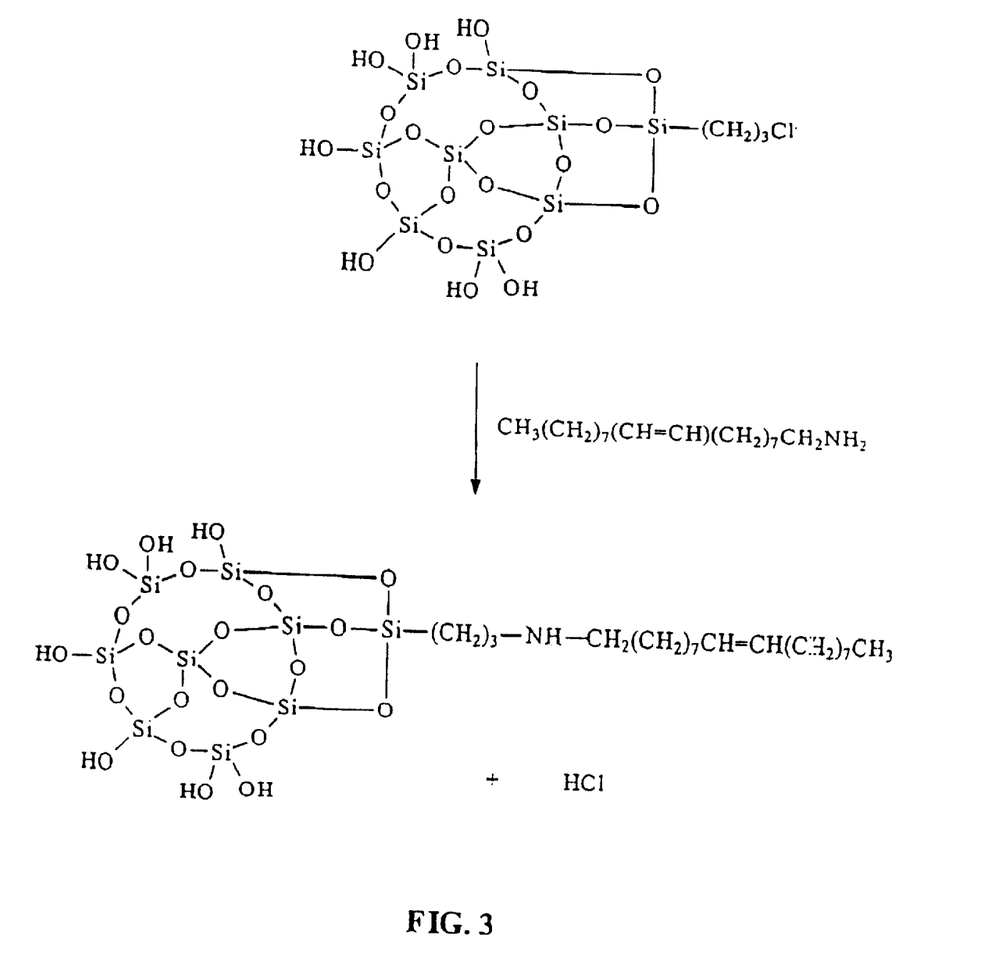
FIG. 3 illustrates a second example of the use of the product of a product of the present process illustrated in FIG. 1.

The product of the present process described thus far preferably results in an aqueous slurry or dispersion of particles (i.e., it has not yet been contacted with a polymer or other substrate to be filled), which can be further treated to produce a particulate material which may be advantageously dispersed in a binder material. For example, the functionality of a coupling agent can be formed on the surface of the particles in situ using the approach described in copending Canadian patent application 2,254,315 filed on Nov. 20, 1998—see FIG. 2 of the present application for an illustrative embodiment of this approach. Alternatively, or in addition, the particles may be further hydrophobicized by forming an aminohydrocarbonsilane moiety can be formed on the surface of the particles in situ using the approach described in copending Canadian patent application 2,254,559 filed on Nov. 20, 1998—see FIG. 3 of the present application for an illustrative embodiment of this approach.

The further treated particles may be used as a compounding agent in a multitude of materials including, but not limited to, the following: predispersion of chemical additives, polymers, alkyd paints, toners such as those used in photocopiers, modified plastics and rubber vulcanizates.

Embodiments of the present invention will be illustrated with reference to the following Example which should not be used to construe or limit the scope of the invention.

EXAMPLE 1

In this Example, the following materials were used:
Hi-Sil® 233
triethoxysilane
chloroplatinic acid
allyl bromide
sodium tetrasulfide
oleylamine
Buna® CB-24 (polybutadiene) cement in hexane
Sundex® 8125
Vulcanox® 4020
N-oleyl-N-(trimethoxysilyl)propyl ammonium chloride In a 4 L glass beaker in a fumehood were combined 510 grams of Hi-Sil® 233 (amorphous precipitated silica available from PPG Industries) and 2040 grams of water, and the resulting mixture was stirred with an air-driven stirrer equipped with a radial impeller until a smooth slurry was obtained. The pH of the slurry was adjusted to 5.5 with dilute HCl. The beaker was placed on a hot plate and the slurry was heated to 60° C. while under high agitation.

Triethoxysilane (40.0 grams, 240 millimoles) was added into the vortex dropwise over 5 minutes. After 10 minutes of stirring, allyl bromide (25.0 grams, 207 millimoles) was added dropwise to the stirring slurry. Using a pipette, 5.0 mL of an 0.5% solution of chloroplatinic acid in methanol were added to the slurry. After 2 hours of additional stirring at 59–60° C., commercial aqueous sodium tetrasulfide solution (38.8 grams of 34 wt % $Na_3S_4$) was added in one shot. The slurry immediately turned a greenish-grey colour. The viscosity increased somewhat and then decreased after 5 minutes. The agitator power was adjusted to maintain circulation.

After two hours and twenty minutes of additional stirring, the colour had faded to an off-white. The agitation was shut off and the beaker was removed from the heat source. The slurry was covered with plastic wrap and allowed to sit overnight in a quiescent state at room temperature. The following morning, the material in the beaker was again placed under agitation at room temperate. A check of the pH using a pH meter gave a reading of 8.4. Commercial distilled oleylamine (Akzo ARMEEN® OLD, 14.6 grams, ~55 millimoles) was dissolved in 50 mL of methanol and the resulting solution was added to the vortex over 5 minutes in 1 mL aliquots. Heating was commenced and the slurry was kept between 40° and 500° C. for two hours. The pH fell steadily during this period from an initial 8.8 to a final 8.5. The pH was then adjusted to 7.5 with diluted hydrochloric acid.

The slurry was cooled to room temperature and then transferred quantitatively to 2.5 L plastic bucket in a fumehood by use of a spatula and a small amount (~55 mL) of wash water.

Polybutadiene cement (3188 grams of 20 wt % Buna® CB-24 in hexane), Sundex® 8125 aromatic process oil (191 grams) and Vulcanox® 4020 antioxidant (5.0 grams) were then added. The blend was agitated manually for 5 minutes with a spatula. The blend was then placed under agitation using the air stirrer an impeller combination used previously. After several minutes, most of the treated silica was picked up by the organic phase and a small volume of cloudy water separated. N-Oleyl-N-(trimethoxysilyl)propyl ammonium chloride (9.6 grams of 50 wt % solution in methanol) was then added to the water phase and mixing was continued for several minutes to yield a crystal clear water phase.

Coagulating was done in a fume hood to remove the solvent. The blend was added slowly to stirred water main- tained at 92–95° C. with low pressure steam. The aqueous coagulation serum remained clear throughout the coagulation. The wet crumb was isolated by screening through a 1-mm sieve, water washed and then dried for 4 hours at 85° C. Product yield was 1327 grams, dry basis.

While the present invention has been described with reference to preferred embodiments and illustrative Examples, it will of course be understood by those of skill in the art that various modifications to these preferred embodiment and illustrative Examples may be made without departing from the spirit and scope of the invention.

All publications, patents and patent applications referred to herein are incorporated by reference in their entirety to the same extent as if each individual publication, patent or patent application was specifically and individually indicated to be incorporated by reference in its entirety.

What is claimed is:

1. A process for treating particles to render them hydrophobic, the process comprising the steps of:
   (i) contacting the particles with a compound of Formula I:

(I)

wherein at least one of $R^1$, $R^2$ and $R^3$ is hydroxyl or a hydrolysable group; and (ii) contacting the particles with a compound of Formula II:

(II)

wherein X is an anion and $R^4$ is either: a divalent group —$(C_yH_{2y})$—, branched or unbranched, wherein y is a whole number from 1 to 40, or a $C_6$–$C_{40}$ aromatic group, and t is either 0 or 1.

2. The process defined in claim 1, wherein each of $R^1$, $R^2$ and $R^3$ is hydroxyl or a hydrolysable group.

3. The process defined in claim 1, wherein the hydrolysable group has the formula $OC_pH_{2p+1}$, where p has a value from 1 to 10.

4. The process defined in claim 1, wherein the hydrolysable group is selected from —Cl and —Br.

5. The process defined in claim 1, wherein $R^4$ is a straight chain $C_1$–$C_{40}$ alkylene moiety.

6. The process defined in claim 1, wherein $R^4$ is a straight chain $C_1$–$C_{10}$ alkylene moiety.

7. The process defined in claim 1, wherein $R^4$ is a straight chain $C_1$–$C_5$ alkylene moiety.

8. The process defined in claim 1, wherein $R^4$ is a phenyl group.

9. The process defined in claim 1, wherein X is selected from the group consisting of acetate, chloride, bromide, iodide and sulphate.

10. The process defined in claim 1, wherein the particles comprise inorganic water insoluble compounds.

11. The process defined in claim 1, wherein the particles are selected from the group consisting of silica, titanium oxide, ferric oxide, hydrated ferric oxide, ferrous oxide, antimony oxide, barium carbonate, zinc oxide, zinc borate, lead oxide (including red lead oxide), dibasic lead phosphite, lead silicate, tribasic lead sulfate and mixtures thereof.

12. The process defined in claim 1, wherein Step (ii) is conducted in the presence of a catalyst.

13. The process defined in claim 12, wherein the catalyst is an inorganic catalyst.

14. The process defined in claim 13, wherein the inorganic catalyst comprises a transition metal.

15. The process defined in claim 14, wherein the transition metal is selected from Group VIII of the Periodic Table.

16. The process defined in claim 13, wherein the inorganic catalyst comprises platinum.

17. The process defined in claim 13, wherein the inorganic catalyst comprises a haloplatinic acid.

18. The process defined in claim 11, wherein the catalyst is an organic catalyst.

19. The process defined in claim 18, wherein the organic catalyst comprises a free radical generating compound.

20. The process defined in claim 18, the organic catalyst is selected from the group comprising peracides, peroxides, persulfates, an azocatalyst and mixtures thereof.

21. The process defined in claim 18, wherein the organic catalyst comprises azobisisobutyronitrile.

22. The process defined in claim 18, wherein the organic catalyst hydrogen peroxide.

23. A process for treating particles comprising the step of contacting particles having one or more of the following formulae:

III(a)

III(b)

III(c)

III(d)

III(e)

wherein:
   P is a particle;
   $R^a$ and $R^b$ may be the same or different and each is selected from the group comprising $C_{1-40}$ alkyl, $C_{2-40}$ mono- or $C_{3-40}$ di-unsaturated alkenyl and $C_{6-40}$ aromatic;

w is an integer in range of 1 to $10^6$ or more; with a compound of Formula II:

(II)

wherein X is an anion and $R^4$ is either: a divalent group —$(C_yH_{2y})$—, branched or unbranched, wherein y is a whole number from 1 to 40, or a $C_6$–$C_{40}$ aromatic group, and t is either 0 or 1.

24. The process defined in claim 23, wherein each of $R^1$, $R^2$ and $R^3$ is hydroxyl or a hydrolysable group.

25. The process defined in claim 23, wherein the hydrolysable group has the formula $OC_pH_{2p+1}$, where p has a value from 1 to 10.

26. The process defined in claim 23, wherein $R^4$ is a straight chain $C_1$–$C_{40}$ alkylene moiety.

27. The process defined in claim 23, wherein $R^4$ is a straight chain $C_1$–$C_{10}$ alkylene moiety.

28. The process defined in claim 23, wherein $R^4$ is a straight chain $C_1$–$C_5$ alkylene moiety.

29. The process defined in claim 23, wherein $R^4$ is a phenyl group.

30. The process defined in claim 23, wherein X is selected from the group consisting of acetate, chloride, bromide, iodide and sulphate.

31. The process defined in claim 23, wherein the particles comprise inorganic water insoluble compounds.

32. The process defined in claim 23, wherein the particles are selected from the group consisting of silica, titanium oxide, ferric oxide, hydrated ferric oxide, ferrous oxide, antimony oxide, barium carbonate, zinc oxide, zinc borate, lead oxide (including red lead oxide), dibasic lead phosphite, lead silicate, tribasic lead sulfate and mixtures thereof.

33. The process defined in claim 23, the process conducted in the presence of a catalyst.

34. The process defined in claim 33, wherein the catalyst is an inorganic catalyst.

35. The process defined in claim 34, wherein the inorganic catalyst comprises a transition metal.

36. The process defined in claim 35, wherein the transition metal is selected from Group VIII of the Periodic Table.

37. The process defined in claim 34, wherein the inorganic catalyst comprises platinum.

38. The process defined in claim 34, wherein the inorganic catalyst comprises a haloplatinic acid.

39. The process defined in claim 33, wherein the catalyst is an organic catalyst.

40. The process defined in claim 39, wherein the organic catalyst comprises a free radical generating compound.

41. The process defined in claim 39, the organic catalyst is selected from the group comprising peroxides, persulfates, azobisisobutyronitrile and mixtures thereof.

42. The process defined in claim 39, wherein the organic catalyst comprises azobisisobutyronitrile.

* * * * *